(12) United States Patent
Sobel et al.

(10) Patent No.: US 8,884,891 B2
(45) Date of Patent: Nov. 11, 2014

(54) TRANSMIT/RECEIVE SWITCH FOR A TOUCH-SCREEN SYSTEM

(75) Inventors: David Amory Sobel, Los Altos, CA (US); Xin Dai, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 808 days.

(21) Appl. No.: 13/097,942

(22) Filed: Apr. 29, 2011

(65) Prior Publication Data
US 2012/0274580 A1 Nov. 1, 2012

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)
USPC ...... 345/173; 345/174; 178/18.01; 178/18.03

(58) Field of Classification Search
USPC ..................... 345/173–175; 178/18.01–18.11
See application file for complete search history.

(56) References Cited

U.S. PATENT DOCUMENTS

| | | | |
|---|---|---|---|
| 8,552,986 B2* | 10/2013 | Wong et al. | 345/173 |
| 2010/0097343 A1* | 4/2010 | Fang | 345/174 |
| 2011/0080370 A1* | 4/2011 | Wu | 345/174 |
| 2011/0234523 A1* | 9/2011 | Chang et al. | 345/173 |

* cited by examiner

*Primary Examiner* — Koosha Sharifi-Tafreshi
(74) *Attorney, Agent, or Firm* — Sterne, Kessler, Goldstein & Fox P.L.L.C.

(57) ABSTRACT

An apparatus that is configurable to perform a forward scan, a row scan, and a column scan is disclosed. The apparatus includes a path selection module coupled to a transmitter and a receiver. The path selection module includes a row-transmit switch, a column-receive switch, a row-receive switch, and a column-transmit switch that are configurable to form various transmit paths and receive paths to perform the forward scan, a row scan, and a column scan. The row-transmit switch and the column-transmit switch cascades switching transistors to protect against large voltage swings present in an output of the transmitter, controls the gate voltage that is applied to these switching transistors to protect against the large voltage swings, and includes additional protection circuitry to ensure their reliability. The column-receive switch and the row-receive switch uses thick oxide transistors to protect thin oxide transistors against the large voltage swings and/or includes additional protection circuitry to ensure their reliability.

20 Claims, 16 Drawing Sheets

TRANSMIT/RECEIVE SWITCH FOR A TOUCH-SCREEN SYSTEM

BACKGROUND OF THE INVENTION

1. Field of Invention

The present invention generally relates to a touch-screen system. More specifically, the present invention relates to a touch-screen system that is configurable to perform a forward scan, a row scan, and a column scan.

2. Related Art

Consumer electronic devices, such as an all-in-one computer, a tablet computer, a smartphone, a personal digital assistant (PDA), a satellite navigation device, video gaming device, a kiosk system in retail and tourist settings, a point of sale system, an automatic teller machine (ATM) to provide some examples, interact with an operator using a touch-screen. The touch-screen provides images to the operator and receives one or more commands and/or data from the operator. A touch-screen system detects a presence and/or a location of a touch from an operator, such as a finger of the operator or a hand of the operator to provide some example, and/or other passive objects available to the operator, such as a stylus to provide an example, within the touch-screen. The consumer electronic devices interpret the presence and/or the location of the touch as the one or more commands and/or the data from the operator.

A first conventional touch-screen system performs a forward scanning routine to sense local electrostatic fields between rows and columns within the touch-screen. The touch-screen includes rows of transparent conductive material, such as indium tin oxide to provide an example, and columns of the transparent conductive material that are arranged to form a touch sensitive area above a display area. During the forward scanning routine, transmitters provide measurement signals to the rows. Local electrostatic fields form between the rows and the columns in response to the measurement signals. The operator disrupts certain local electrostatic fields between the rows and the columns by touching, or being sufficiently proximate, to the display area. The local electrostatic fields, along with these disruptions, are received by receivers from the columns. The consumer electronic devices use these disruptions to interpret the presence and/or the location of the touch as the one or more commands and/or the data from the operator.

A second conventional touch-screen system performs a row scanning routine or a column scanning routine to sense local electrostatic fields between rows or columns within the touch-screen. During the rows scanning routine, transmitters provide measurement signals to the rows. Local electrostatic fields form between the rows in response to the measurement signals. The operator disrupts certain local electrostatic fields between the rows by touching, or being sufficiently proximate, to the touch-screen. The local electrostatic fields, along with these disruptions, are received by receivers from the rows. The consumer electronic devices use these disruptions to interpret the presence and/or the location of the touch as the one or more commands and/or the data from the operator.

However, the transmitters and the receivers of the first and the second conventional touch-screen systems are hard wired to the touch-screen. The first conventional touch-screen system cannot presently be configured to perform the row scanning or the column scanning routines. Likewise the second conventional touch-screen system cannot presently be configured to perform the forward scanning routine. Thus, there is a need for an apparatus that is configurable to perform a forward scan, a row scan, and a column scan that overcomes the shortcomings described above. Further aspects and advantages of the present invention will become apparent from the detailed description that follows.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 1:
FIG. 1 illustrates a mobile device according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

A Mobile Device According to an Exemplary Embodiment of the Present Invention

FIG. 1 illustrates a mobile device according to an exemplary embodiment of the present invention. A mobile device 100 represents a communications device used for voice or data communications from a near-end user to a far-end user over a cellular network. The mobile device 100 may communicate with one or more fixed location transceivers, referred to as cell cites, within the cellular network. The cell cites are connected to a cellular telephone exchange that connects to a public telephone network or to another cellular telephone exchange within the cellular network allowing the near-end user to communicate, via the mobile device 100, with the far-end user. The mobile device 100 may support additional services and accessories, such as Short Message Service (SMS), electronic mail, Internet access, gaming, short range wireless communications, camera, Multimedia Messaging Service (MMS) messaging, digital audio player, radio, and Global Positioning System (GPS) services and/or any other suitable service and/or accessory that will be apparent to those skilled in the relevant art(s) without departing from the spirit and scope of the present invention.

The mobile device 100 includes a touch-screen 102 to provide a graphical user interface for the near-end user. The touch-screen 102 operates as an output device to provide images relating to the voice or the data communications and/or the additional services and accessories to the near-end user. The touch-screen 102 also operates as an input device to receive one or more commands and/or data from the near-end user for the voice or data communications and/or the additional services and accessories. The touch-screen 102 detects a presence and/or a location of a touch from a near-end user, such as a finger of the near-end user or a hand of the near-end user to provide some example, and/or other passive objects available to the near-end user, such as a stylus to provide an example, within the touch-screen 102. The mobile device 100 interprets the presence and/or the location of the touch as the one or more commands and/or the data from the near-end user.

Those skilled in the relevant art(s) will recognize that the present invention as described herein is applicable to any other suitable electronic device that includes a touch-screen such as an all-in-one computer, a tablet computer, a smartphone, a personal digital assistant (PDA), a satellite navigation device, video gaming device, a kiosk system in retail and tourist settings, a point of sale system, an automatic teller machine (ATM), or any other suitable electronic device that will be apparent to those skilled in the relevant art(s) without departing from the spirit and scope of the present invention.

A First Conventional Touch-Screen System

Figure 2:
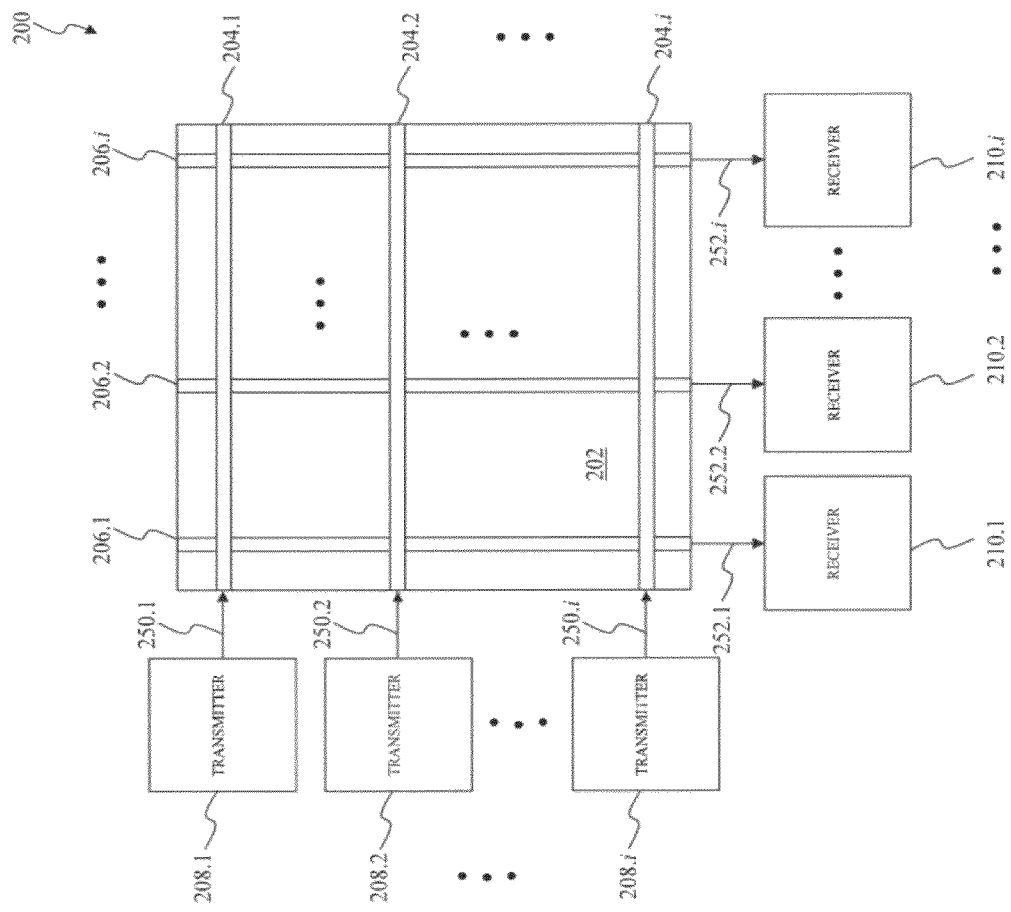
FIG. 2 illustrates a block diagram of a first conventional touch-screen system.

FIG. 2 illustrates a block diagram of a first conventional touch-screen system. A conventional touch-screen system 200 performs a forward scanning routine to sense local electrostatic fields between rows and columns within a display area 202. The display area 202 may represent a liquid crystal display (LCD) area, an opaque display area, or any other suitable display area that will be apparent to those skilled in the relevant art(s) without departing from the spirit and scope of the present invention. The conventional touch-screen system 200 includes rows 204.1 through 204.$i$ of transparent conductive material, such as indium tin oxide to provide an example, and columns 206.1 through 206.$i$ of the transparent conductive material that are arranged to form a touch sensitive area above the display area 202. The display area 202, the rows 204.1 through 204.$i$, and the columns 206.1 through 206.$i$ may be configured to form the touch-screen 102.

The conventional touch-screen system 200 may be characterized as sensing local electrostatic fields between rows and columns, namely between the rows 204.1 through 204.$i$ and the columns 206.1 through 206.$i$. The conventional touch-screen system 200 includes transmitters 208.1 through 208.$i$ and receivers 210.1 through 210.$i$. Each of the transmitters 208.1 through 208.$i$ provides a corresponding row measurement signal 250.1 through 250.$i$ to a corresponding row 204.1 through 204.$i$. Likewise, each of the receivers 210.1 through 210.*i* receives a corresponding column measurement signal 252.1 through 252.*i* from a corresponding column 206.1 through 206.*i*.

During the forward scanning routine, the transmitters 208.1 through 208.*i* provide the row measurement signals 250.1 through 250.*i*. Local electrostatic fields form between the rows 204.1 through 204.*i* and the columns 206.1 through 206.*i* in response to the row measurement signals 250.1 through 250.*i*. The near-end user disrupts certain local electrostatic fields between the rows and the columns, namely between at least one of the rows 204.1 through 204.*i* and at least one of the columns 206.1 through 206.*i*, by touching, or being sufficiently proximate, to the display area 202. The local electrostatic fields, along with these disruptions, are received by the receivers 210.1 through 210.*i* from the column measurement signals 252.1 through 252.*i*.

A Second Conventional Touch-Screen System

Figure 3:
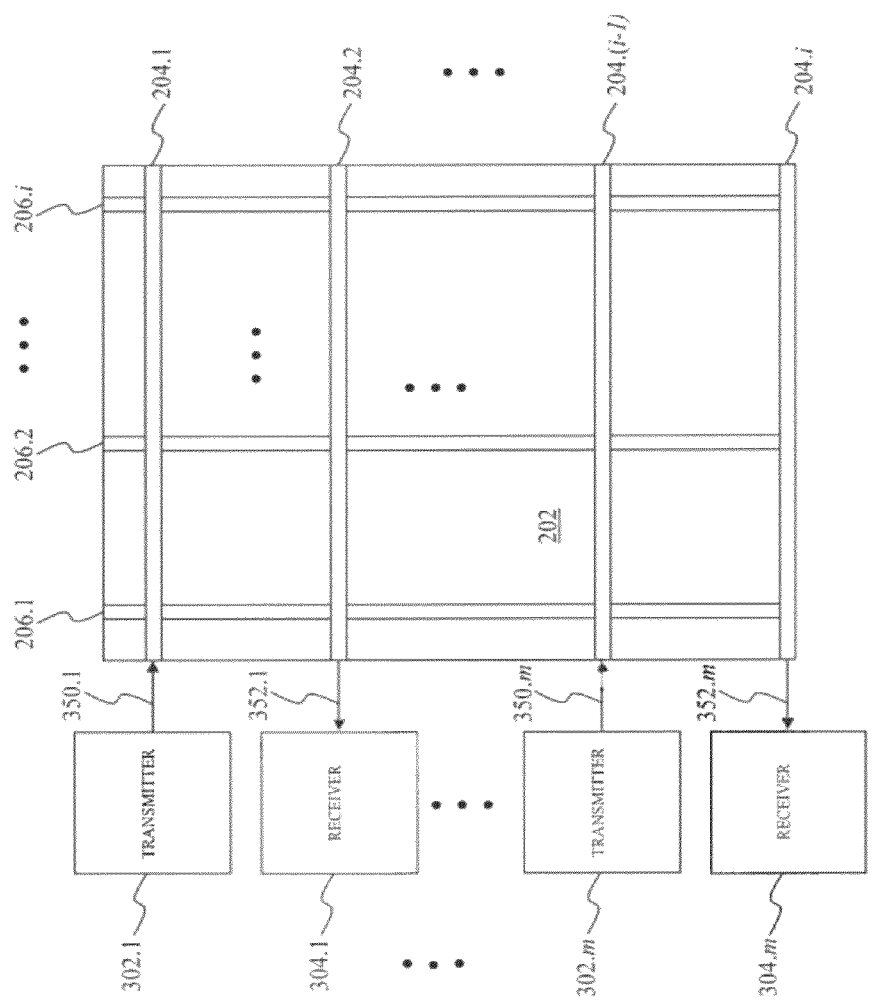
FIG. 3 illustrates a block diagram of a second conventional touch-screen system.

FIG. 3 illustrates a block diagram of a second conventional touch-screen system. A conventional touch-screen system 300 performs a row scanning routine to sense local electrostatic fields between rows within the display area 202. Those skilled in the relevant art(s) will recognize that a similar conventional touch-screen system may be implemented to perform a column scanning routine. The conventional touch-screen system 300 includes transmitters 302.1 through 302.*m* and receivers 304.1 through 304.*m*. Each of the transmitters 302.1 through 302.*m* provides a corresponding row measurement signal 350.1 through 350.*m* to a corresponding row 204.1 through 204.*i*. Likewise, each of the receivers 304.1 through 304.*m* receives a corresponding row measurement signal 352.1 through 352.*m* from a corresponding row 204.1 through 204.*i*. For example, the transmitter 302.1 provides the row measurement signal 350.1 to the row 204.1 and the receiver 304.1 receives the row measurement signal 352.1 from the row 204.2.

During the row scanning routine, the transmitters 302.1 through 302.*m* provide the row measurement signals 350.1 through 350.*m*. Local electrostatic fields form between the rows 204.1 through 204.*i* in response to the row measurement signals 350.1 through 350.*i*. The near-end user disrupts certain local electrostatic fields between the rows, namely between at least two of the rows 204.1 through 204.*i*, by touching, or being sufficiently proximate, to the display area 202. The local electrostatic fields, along with these disruptions, are received by the receivers 304.1 through 304.*m* from the row measurement signals 352.1 through 352.*m*.

Figure 4:
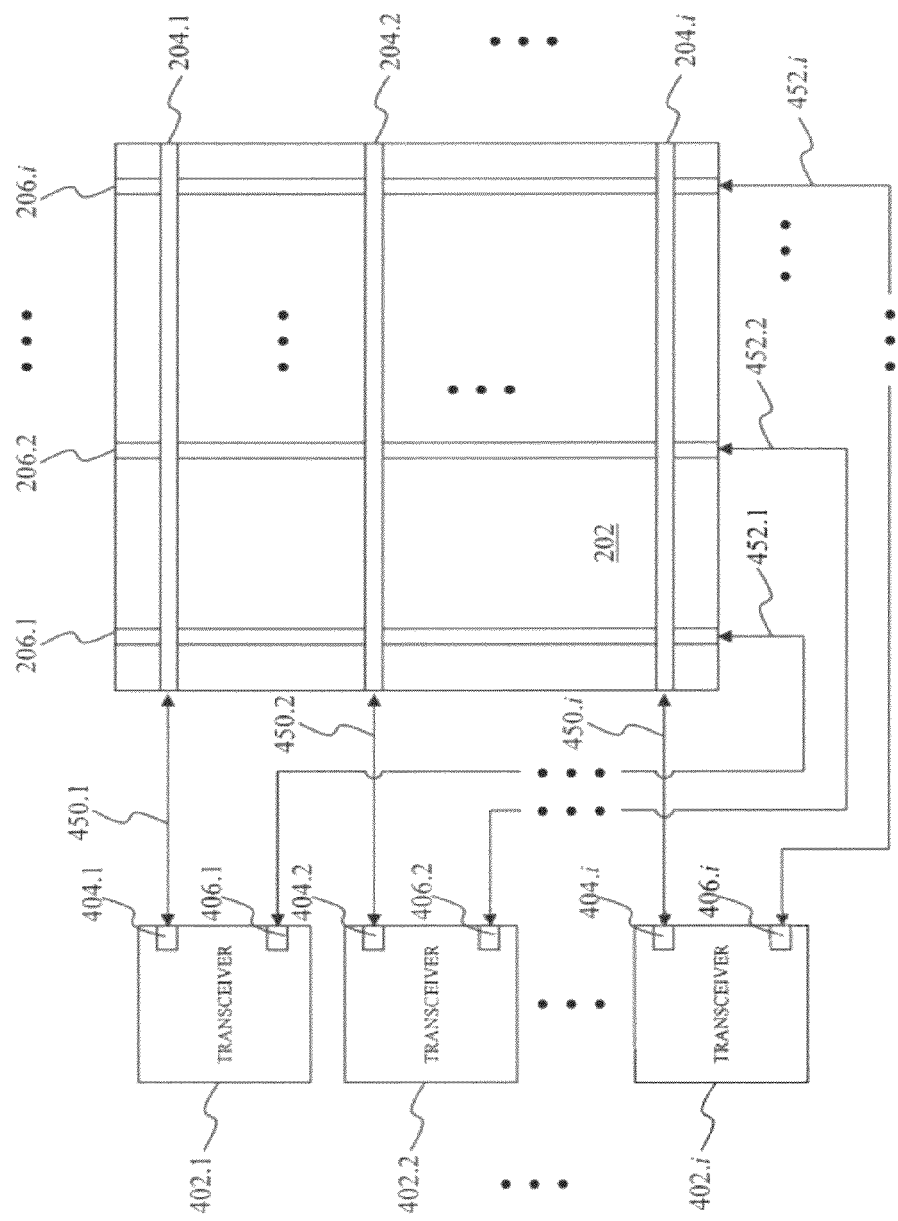
FIG. 4 illustrates a block diagram of a touch-screen system according to an exemplary embodiment of the present invention.

A Touch-Screen System According to an Exemplary Embodiment of the Present Invention FIG. 4 illustrates a block diagram of a touch-screen system according to an exemplary embodiment of the present invention. Unlike the conventional touch-screen system 200 which performs a forward scan, and the conventional touch-screen system 300 which performs a row scan or a column scan, the touch-screen system 400 is configurable to perform a forward scan, a row scan, and a column scan. Specifically, the touch-screen system 400 may be characterized as sensing disruptions in local electrostatic fields between the rows 204.1 through 204.*i* and the columns 206.1 through 206.*i*, two or more of the rows 204.1 through 204.*i*, two or more of the columns 206.1 through 206.*i*, or any combination thereof.

The touch-screen system 400 includes transceivers 402.1 through 402.*i* having row ports 404.1 through 404.*i* and column ports 406.1 through 406.*i*. Each of the row ports 404.1 through 404.*i* are coupled to a corresponding row from among the rows 204.1 through 204.*i* through and each of the column ports 406.1 through 406.*i* are coupled to a corresponding column from among the columns 206.1 through 206.*i*, Each of the transceivers 402.1 through 402.*i* are configurable to operate in a pass-through mode of operation and a crossover mode of operation. in the pass-through mode of operation, each of the transceivers 402.1 through 402.*i* transmit a corresponding row measurement signal 450.1 through 450.*i* to a corresponding row 204.1 through 204.*i* and receive a corresponding column measurement signal 452.1 through 452.*i* from a corresponding column 206.1 through 206.*i*. In contrast, each of the transceivers 402.1 through 402.*i* receive a corresponding row measurement signal 450.1 through 450.*i* from a corresponding row 204.1 through 204.*i* and transmit a corresponding column measurement signal 452.1 through 452.*i* to a corresponding column 206.1 through 206.*i* in the crossover mode of operation.

The configurability of the transceivers 402.1 through 402.*i* allows the touch-screen system 400 to sense local electrostatic fields between rows and columns, between adjacent rows, between adjacent columns, and/or any combination thereof. To perform the forward scan, at least one transceiver 402.1 through 402.*i* is configured to operate in the pass-through mode of operation to transmit its row measurement signal 450.1 through 450.*i* to its row 204.1 through 204.*i*. Local electrostatic fields form between the corresponding row 204.1. through 204.*i* and the columns 206.1 through 206.*i* in response to the corresponding row measurement signal 450.1 through 450.*i*. The near-end user disrupts certain local electrostatic fields between the rows and the columns, namely between at least one of the rows 204.1 through 204.*i* and at least one of the columns 206.1 through 206.*i*, by touching, or being sufficiently proximate, to the display area 202. At least one transceiver 402.1 through 402.*i* is configured to operate in the pass-through mode of operation to receive the local electrostatic fields from its column measurement signal 452.1 through 452.*i*.

To perform the row scan, at least one transceiver 402.1 through 402.*i* is configured to operate in the pass-through mode of operation to transmit its row measurement signal 450.1 through 450.*i* to its row 204.1 through 204.*i*. Local electrostatic fields form between the rows 204.1 through 204.*i* in response to the corresponding row measurement signal 450.1 through 450.*i*. The near-end user disrupts certain local electrostatic fields between the rows, namely between at least two of the rows 204.1 through 204.*i*, by touching, or being sufficiently proximate, to the display area 202. At least one transceiver 402.1 through 402.*i* is configured to operate in the crossover mode of operation to receive the local electrostatic fields from its row measurement signal 450.1 through 450.*i*.

To perform the column scan, at least one transceiver 402.1 through 402.*i* is configured to operate in the crossover mode of operation to transmit its column measurement signal 452.1 through 452.*i* to its column 206.1 through 206.*i*. Local electrostatic fields form between the columns 206.1 through 206.*i* in response to the corresponding column measurement signal 452.1 through 452.*i*. The near-end user disrupts certain local electrostatic fields between the columns, namely between at least two of the columns 206.1 through 206.*i*, by touching, or being sufficiently proximate, to the display area 202. At least one transceiver 402.1 through 402.*i* is configured to operate in the pass-through mode of operation to receive the local electrostatic fields from its column measurement signal 452.1 through 452.*i*.

Figure 5:
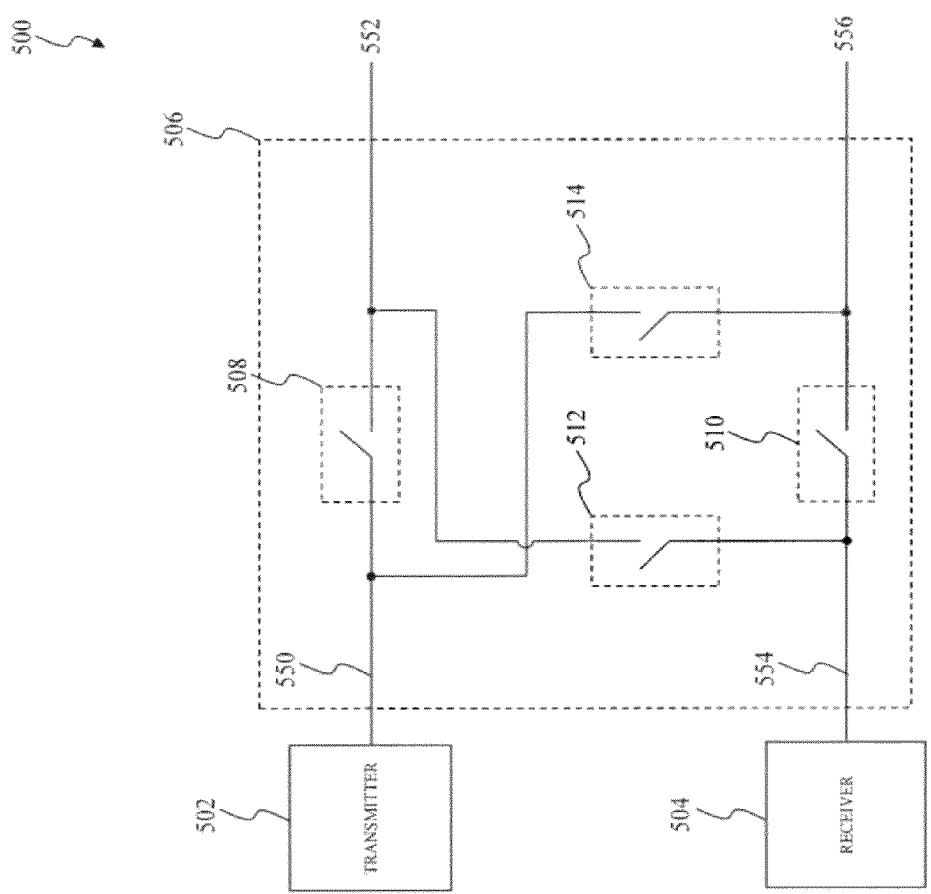
FIG. 5 illustrates a block diagram of a transceiver that is implemented as part of the touch-screen system according to an exemplary embodiment of the present invention.

A Transceiver that is Implemented as Part of the Touch-Screen System According to an Examplary Embodiment of the Present Invention FIG. 5 illustrates a block diagram of a transceiver that is implemented as part of the touch-screen system according to an exemplary embodiment of the present invention. A transceiver 500 may represent an exemplary embodiment of one or more of the transceivers 402.1 through 402.i. In this exemplary embodiment, a row measurement signal 552 represents a corresponding one of the first row measurement signals 450.1 through 450.i and a column measurement signal 556 represents a corresponding one of the measurement signals 452.1 through 452.i. The transceiver 500 includes a transmitter 502, and a receiver 504, and a switching module 506.

The switching module 506 is coupled to a row from among the rows 204.1 through 204.i via the row measurement signal 552 and a column from among the columns 206.1 through 206.i via the column measurement signal 556. The switching module 506 represents a path selection module that is configurable to form various transmit paths and receive paths. The switching module 506 may be configurable to form a pass-through path to route a transmitted signal 550 from the transmitter 502 to become the row measurement signal 552 and to route the column measurement signal 556 to become a received signal 554 for the receiver 504. The switching module 506 may also be configurable to form a crossover path to route the transmitted signal 550 from the transmitter 502 to become the column measurement signal 556 and to route the row measurement signal 552 to become the received signal 554 for the receiver 504.

In an exemplary embodiment, the switching module 506 is implemented as a butterfly switching circuit. In this exemplary embodiment, the switching module 506 includes a row-transmit switch 508, a column-receive switch 510, a row-receive switch 512, and a column-transmit switch 514. In a pass-through mode of operation, the row-transmit switch 508 is closed and the column-transmit switch 514 is open to form a row-transmit path to route the transmitted signal 550 to become the row measurement signal 552. Likewise, in the pass-through mode of operation the column-receive switch 510 is closed and the row-receive switch 512 is open to form a column-receive path to route the column measurement signal 556 to become the received signal 554.

In the crossover mode of operation, the row-transmit switch 508 is open and the column-transmit switch 514 is closed to form the column-transmit path to route the transmitted signal 550 to become the column measurement signal 556. Likewise, in the crossover mode of operation the column-receive switch 510 is open and the row-receive switch 512 is closed to form the column-receive path to route the row measurement signal 552 to become the received signal 554.

A Transmit Switch that is Implemented as Part of the Transceiver According to an Exemplary Embodiment of the Present Invention The switching module 506 typically operates at a lower operating voltage when compared to an operating voltage of the transmitter 502. Consequently, the transmitter 502 and/or the switching module 506 are commonly fabricated using different fabrication processes to reduce size, cost, and/or power consumption of the transceiver 500. For example, the transmitter 502 may be fabricated using a high operating voltage process and the switching module 506 may be fabricated using a low operating voltage process. Typically, the low operating voltage process is used for lower power devices with thinner gate oxides when compared with the high operating voltage process. Semiconductor designers are concerned with reliability of their semiconductor devices especially when the high operating voltage process and the low operating voltage process are mixed. For example, a voltage swing of the transmitted signal 550, such as a 5V peak-to-peak swing to provide an example, may exceed a voltage limit of the low operating voltage process, such as 3.3V to provide an example, that is used to fabricate the switching module 506. In this situation, the large voltage swing of the transmitted signal 550 may impede the reliability of the switching module 506.

To increase the reliability of the switching module, a transmit switch used in the switching module: (1) cascodes switching transistors to protect against large voltage swings; (2) controls gates voltage that are applied to the switching transistors to protect against large voltage swings; and/or (3) includes additional protection circuitry to ensure reliability of the transmit switch. The transmit switch is further discussed below in FIG. 6A through FIG. 9.

Similarly, to increase the reliability of the switching module, a receive switch used in the switching module: (1) uses thick oxide transistors to protect thin oxide transistors against the large voltage swings; and/or (2) includes additional protection circuitry to ensure reliability of the receive switch. The receive switch is further discussed below in FIG. 10.

Figure 6A:
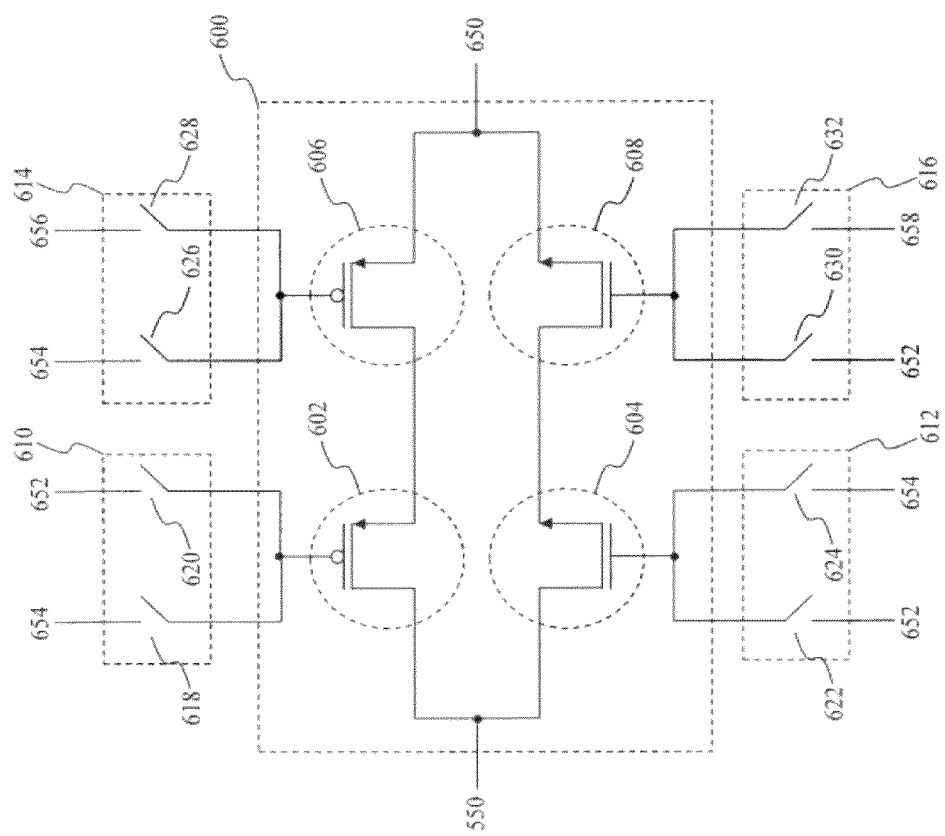
FIG. 6A illustrates a block diagram of a transmit switch that is implemented as part of the transceiver according to an exemplary embodiment of the present invention.

Cascoding of Transistors Within the Transmit Switch to Protect Against Large Voltage Swing FIG. 6A illustrates a block diagram of a transmit switch that is implemented as part of the transceiver according to an exemplary embodiment of the present invention. A transmit switch 600 is characterized as passing the transmitted signal 550 to become either the row measurement signal 552 or the column measurement signal 556 in a conducting mode of operation and preventing the transmitted signal 550 from becoming either the column measurement signal 556 or the row measurement signal 552 in a non-conducting mode of operation. The transmit switch 600 may represent an exemplary embodiment of the row-transmit switch 508. In this exemplary embodiment, the transmit switch 600 is characterized as passing the transmitted signal 550 to become the row measurement signal 552 in the conducting mode of operation and preventing the transmitted signal 550 from becoming the row measurement signal 552 in the non-conducting mode of operation. The transmit switch 600 may also represent an exemplary embodiment of the column-transmit switch 514. In this exemplary embodiment, the transmit switch 600 is characterized as passing the transmitted signal 550 to become the column measurement signal 556 in the conducting mode of operation and preventing the transmitted signal 550 from becoming the column measurement signal 556 in the non-conducting mode of operation.

The transmit switch 600 includes a p-type switching transistor 602 cascoded with a p-type switching transistor 606 and an n-type switching transistor 604 cascoded with an n-type switching transistor 608 to increase the reliability of the transmit switch 600. However this example is not limiting, those skilled in the relevant art(s) may implement the transmit switch 600 differently using only n-type transistors or p-type transistors without departing from the spirit and scope of the present invention.

The transmitted signal 550 passes through a drain and a source of the p-type switching transistor 602 and through a drain and a source of the p-type switching transistor 606 to a measurement signal 650 when the p-type switching transistor 602 and the p-type switching transistor 606 are conducting. The measurement signal 650 may represent an exemplary embodiment of the row measurement signal 552 and/or the column measurement signal 556. Likewise, the transmitted signal 550 passes through a source and a drain of the n-type switching transistor 604 and through a drain and a source of the n-type switching transistor 608 to the measurement signal 650 when the n-type switching transistor 604 and the n-type switching transistor 608 are conducting. Cascoding the p-type switching transistor 602, the n-type switching transistor 604, the p-type switching transistor 606, and the n-type switching transistor 608 in this manner reduces the voltage drop that each transistor must incur across its respective source and drain.

The p-type switching transistor 602, the n-type switching transistor 604, the p-type switching transistor 606, and the n-type switching transistor 608 are coupled to a first switch bank 610, a second switch bank 612, a third switch bank 614, and a fourth switch bank 616, respectively. The first switch bank 610 includes a first activation switch 618 coupled to a p-type turn-on gate voltage 654 and a first deactivation switch 620 coupled to an n-type turn-on gate voltage 652. The n-type turn-on gate voltage 652 and the p-type turn-on gate voltage 654 may be selectively applied to the p-type switching transistor 602 by activating and/or deactivating the first activation switch 618 and/or the first deactivation switch 620.

The n-type turn-on gate voltage 652 and the p-type turn-on gate voltage 654 are controlled to ensure that the p-type switching transistor 602, the n-type switching transistor 604, the p-type switching transistor 606, and the n-type switching transistor 608 have a low on resistance when activated in the conducting mode of operation. This low on resistance prevents a large voltage drop from occurring across the respective drains and sources of these transistors when passing the transmitted signal 550.

Controlling Gate Voltage Applied to Transistors Within the Transmit Switch to Protect Against Large Voltage Swing Conventionally, a first value of approximately 5V for the n-type turn-on gate voltage 652 is used to activate the n-type switching transistor 604 and the n-type switching transistor 608 and a second value of approximately 0V is used to deactivate these transistors. Likewise, a first value of approximately 0V for the p-type turn-on gate voltage 654 is used to activate the p-type switching transistor 602 and the p-type switching transistor 606 and a second value of approximately 5V is used to deactivate these transistors. However, the large voltage swings between the first value and the second values of the n-type turn-on gate voltage 652 and the first value and the second values of the p-type turn-on gate voltage 654 may impede the reliability of the transmit switch 600.

Figure 7A:
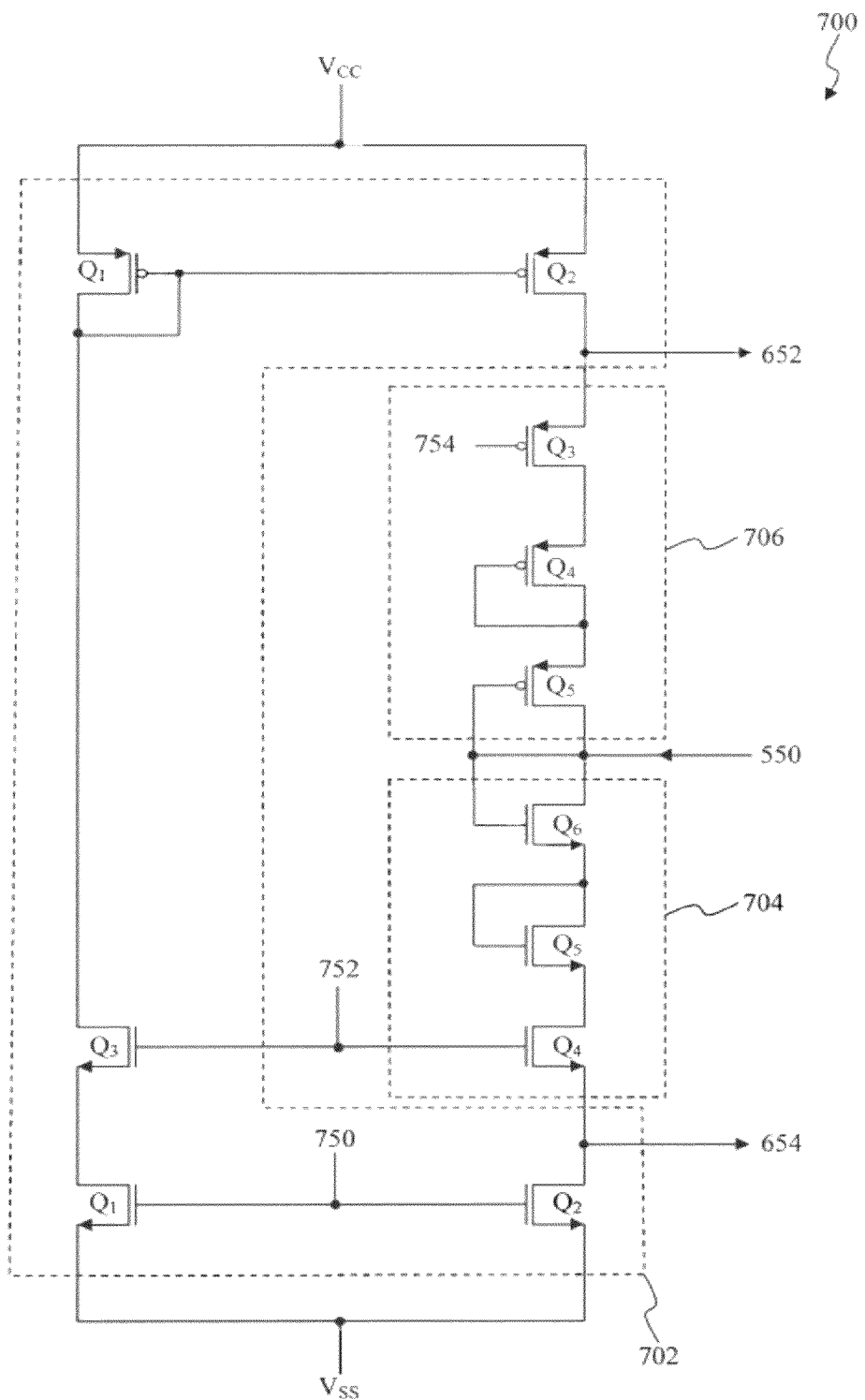
FIG. 7A illustrates a block diagram of a gate control voltage generation module according to an exemplary embodiment of the present invention.

FIG. 7A illustrates a block diagram of a gate control voltage generation module according to an exemplary embodiment of the present invention. To increase the reliability of the transmit switch 600, a gate control module 700 generates the n-type turn-on gate voltage 652 and the p-type turn-on gate voltage 654 such that they have sufficient margin to activate the p-type switching transistor 602 and the p-type switching transistor 606 without impeding their reliability. The gate control module 700 includes a biasing module 702, a p-type turn-on voltage control module 704, and an n-type turn-on voltage control module 706.

The biasing module 702 provides a first bias current to the p-type turn-on voltage control module 704 and a second bias current to the n-type turn-on voltage control module 706. Specifically, the biasing module 702 includes an n-type transistor $Q_1$ and an n-type transistor $Q_2$ configured and arranged to form a first current mirror, an n-type transistor $Q_3$ and a p-type transistor $Q_1$ and a p-type transistor $Q2$ configured and arranged to form a second current mirror. The first current mirror is configured and arranged to provide the first bias current to the p-type turn-on voltage control module 704. The n-type transistor $Q_3$ protects the n-type transistor $Q_1$ from incurring too large of a voltage across its respective source and drain. The second current mirror is configured and arranged to provide a second bias current to the n-type turn-on voltage control module 706. The voltage swing of the n-type turn-on gate voltage 652 and the p-type turn-on gate voltage 654 may be adjusted by adjusting the biasing reference 750 which changes the first and the second bias currents.

The p-type turn-on voltage control module 704 operates upon the transmitted signal 550 to reduce a voltage swing of the transmitted signal 550 and to translate a mean of the transmitted signal 550 to provide the p-type turn-on gate voltage 654. The voltage swing and/or the mean value of the p-type turn-on gate voltage 654 may be adjusted by increasing and/or decreasing a p-type reference 752. In an exemplary embodiment, the p-type reference 752 is approximately 3.0V. Specifically, the p-type turn-on voltage control module 704 includes an n-type transistor $Q_4$ to adjust the voltage swing and/or the mean of the p-type turn-on gate voltage 654. An optional n-type transistor $Q_5$ and an optional n-type transistor $Q_6$ are configured and arranged in series with the n-type transistor $Q_4$ such that the p-type turn-on gate voltage 654 is of sufficient level to activate the p-type switching transistor 602 and the p-type switching transistor 606.

The n-type turn-on voltage control module 706 operates upon the transmitted signal 550 to reduce the voltage swing of the transmitted signal 550 and to translate the mean of the transmitted signal 550 to provide the n-type turn-on gate voltage 652. The voltage swing and/or the mean value of the n-type turn-on gate voltage 652 may be adjusted by increasing and/or decreasing an n-type reference 754. In an exemplary embodiment, the n-type reference 754 is approximately 2.0V. Specifically, the n-type turn-on voltage control module 706 includes a p-type transistor $Q_3$ to adjust the voltage swing and/or the mean of the n-type turn-on gate voltage 652. An optional p-type transistor $Q_4$ and an optional p-type transistor $Q_5$ are configured and arranged in series with the p-type transistor $Q_3$ such that the n-type turn-on gate voltage 652 is of sufficient level to activate the n-type switching transistor 604 and the n-type switching transistor 608.

Figure 7B:
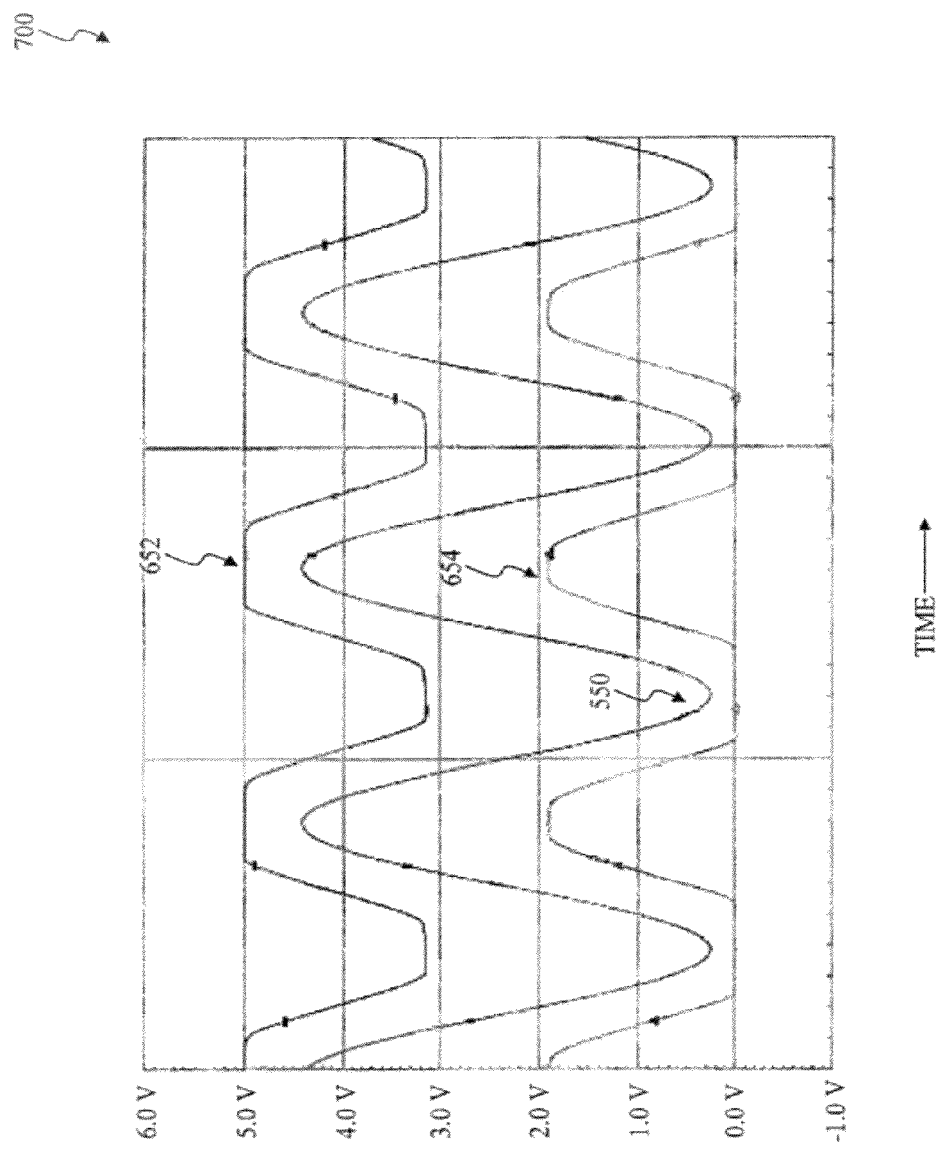
FIG. 7B is a graphic illustration of gate control voltages generated by the gate control voltage generation module according to an exemplary embodiment of the present invention.

FIG. 7B is a graphic illustration of gate control voltages generated by the gate control voltage generation module according to an exemplary embodiment of the present invention. As shown in a graphic illustration 700, the n-type turn-on gate voltage 652 and the p-type turn-on gate voltage 654 are related to the transmitted signal 550. Specifically, the n-type turn-on gate voltage 652 and the p-type turn-on gate voltage 654 typically may be characterized as having a substantially similar frequency and/or phase as the transmitted signal 550. The n-type turn-on gate voltage 652 is characterized as having a mean value which is approximately greater than a mean value of the transmitted signal 550 by approximately:

$$V_{DS,Q3}+V_{GS,Q4}+V_{GS,Q5}, \quad (1)$$

where $V_{DS,Q3}$ represents a drain to source voltage of the p-type transistor $Q_3$, $V_{GS,Q4}$ represents a gate to source voltage of the p-type transistor $Q_4$, and $V_{GS,Q5}$ represents a gate to source voltage of the p-type transistor $Q_5$. The n-type turn-on gate voltage 652 typically has a maximum value of approximately $V_{CC}$ and a minimum value of approximately:

$$V_{754}+V_{GS,Q3}, \quad (2)$$

where $V_{754}$ represents a voltage level of the n-type reference 754 and $V_{GS,Q3}$ represents a gate to source voltage of the p-type transistor $Q_3$.

The p-type turn-on gate voltage 654 is characterized as having a mean value which is approximately less than a mean value of the transmitted signal 550 by approximately:

$$V_{DS,Q4}+V_{GS,Q5}+V_{GS,Q6}, \quad (3)$$

where $V_{DS,Q4}$ represents a drain to source voltage of the n-type transistor $Q_4$, $V_{GS,Q5}$ represents a gate to source voltage of the n-type transistor $Q_5$, and $V_{GS,Q6}$ represents a gate to source voltage of the n-type transistor $Q_6$. The p-type turn-on gate voltage 654 typically has a minimum value of approximately $V_{SS}$ and a maximum value of approximately:

$$V_{752} - V_{GS,Q4}, \quad (4)$$

where $V_{752}$ represents a voltage level of the p-type reference 752 and $V_{GS,Q4}$ represents a gate to source voltage of the n-type transistor $Q_4$.

Referring back to FIG. 6A, the second switch bank 612 includes a second activation switch 622 coupled to the n-type turn-on gate voltage 652 and a second deactivation switch 624 coupled to the p-type turn-on gate voltage 654. The n-type turn-on gate voltage 652 and the p-type turn-on gate voltage 654 may be selectively applied by the second switch bank 612 to the n-type switching transistor 604 by activating and/or deactivating the second activation switch 622 and/or the second deactivation switch 624.

Similarly, the third switch bank 614 includes a third activation switch 626 coupled to the p-type turn-on gate voltage 654 and a third deactivation switch 628 coupled to a first potential 656, such as 3.3V to provide an example. The p-type turn-on gate voltage 654 and the first potential 656 may be selectively applied by the third switch bank 614 to the p-type switching, transistor 606 by activating and/or deactivating the third activation switch 626 and/or the third deactivation switch 628.

Likewise, the fourth switch bank 616 includes an fourth activation switch 630 coupled to the n-type turn-on gate voltage 652 and a fourth deactivation switch 632 coupled to a second potential 658, such as approximately 0V to provide an example. The n-type turn-on gate voltage 652 and the second potential 658 may be selectively applied by the fourth switch bank 616 to the n-type switching transistor 608 by activating and/or deactivating the fourth activation switch 630 and/or the fourth deactivation switch 632.

Figure 6B:
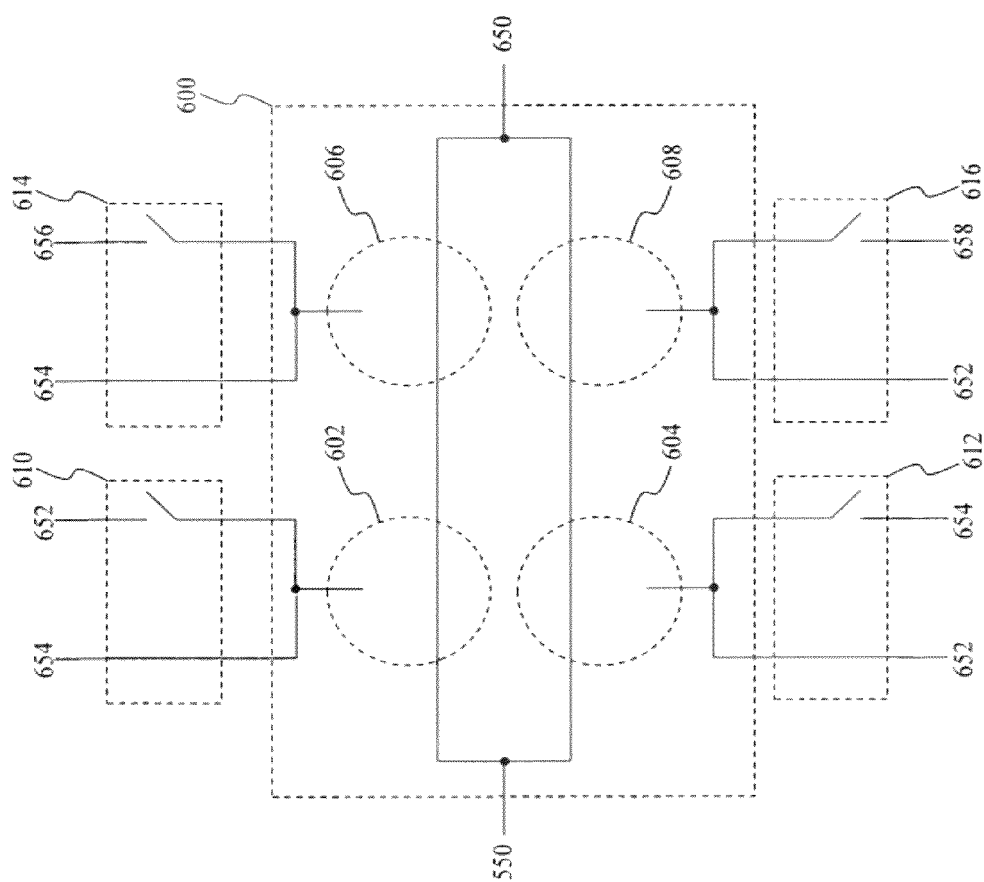
FIG. 6B illustrates a block diagram of a conducting mode of operation of the transmit switch that is implemented as part of the transceiver according to an exemplary embodiment of the present invention.

FIG. 6B illustrates a block diagram of a conducting mode of operation of the transmit switch that is implemented as part of the transceiver according to an exemplary embodiment of the present invention. In the conducting mode of operation, the transmit switch 600 selectively applies the p-type turn-on gate voltage 654 to the p-type switching transistor 602 and to the p-type switching transistor 606. Similarly, the transmit switch 600 selectively applies the n-type turn-on gate voltage 652 to the n-type switching transistor 604 and to the n-type switching transistor 608 in the conducting mode of operation. As a result, the p-type switching transistor 602, the n-type switching transistor 604, the p-type switching transistor 606, and the n-type switching transistor 608 are conducting, thereby passing the transmitted signal 550 to become the measurement signal 650.

Figure 6C:
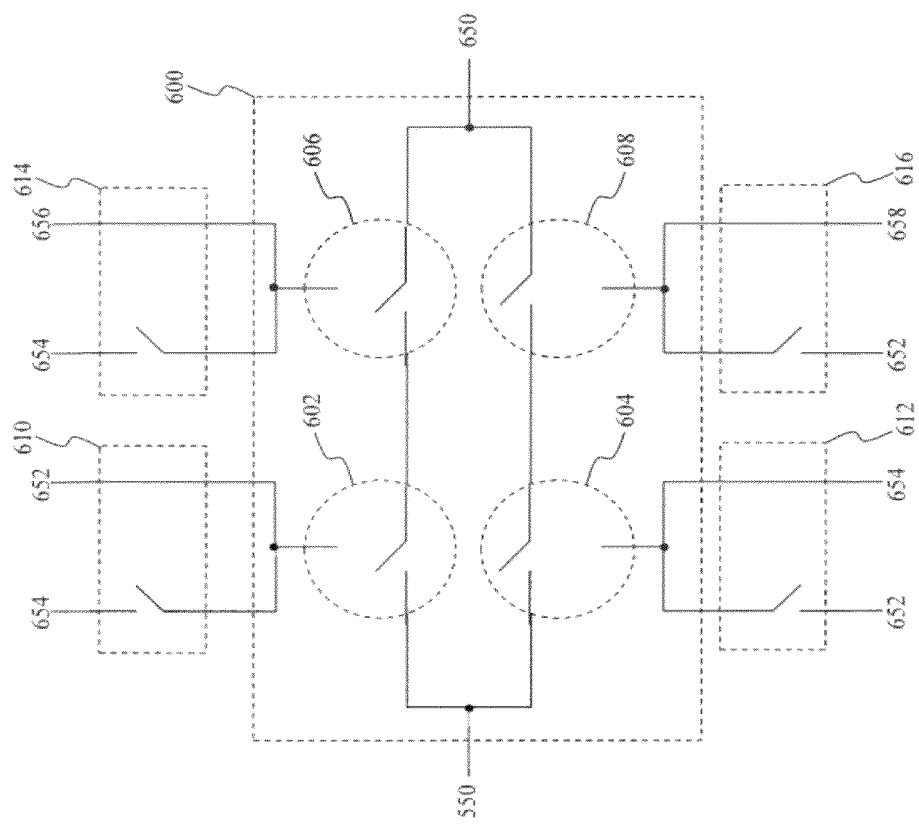
FIG. 6C illustrates a block diagram of a non-conducting mode of operation of the transmit switch that is implemented as part of the transceiver according to an exemplary embodiment of the present invention.

FIG. 6C illustrates a block diagram of a non-conducting mode of operation of the transmit switch that is implemented as part of the transceiver according to an exemplary embodiment of the present invention. In the non-conducting mode of operation, the transmit switch 600 selectively applies the n-type turn-on gate voltage 652 to the p-type switching transistor 602. The transmit switch 600 selectively applies the p-type turn-on gate voltage 654 to the n-type switching transistor 604. The transmit switch 600 selectively applies the first potential 656 to the p-type switching transistor 606. The transmit switch 600 selectively applies the second potential 658 to the n-type switching transistor 608. As a result, the p-type switching transistor 602, the n-type switching transistor 604, p-type switching transistor 606, and the n-type switching transistor 608 are non-conducting, thereby preventing the transmitted signal 550 from being passed to become the measurement signal 650.

Additional Protection Circuitry to Ensure Reliability of the Transmit Switch

Figure 8A:
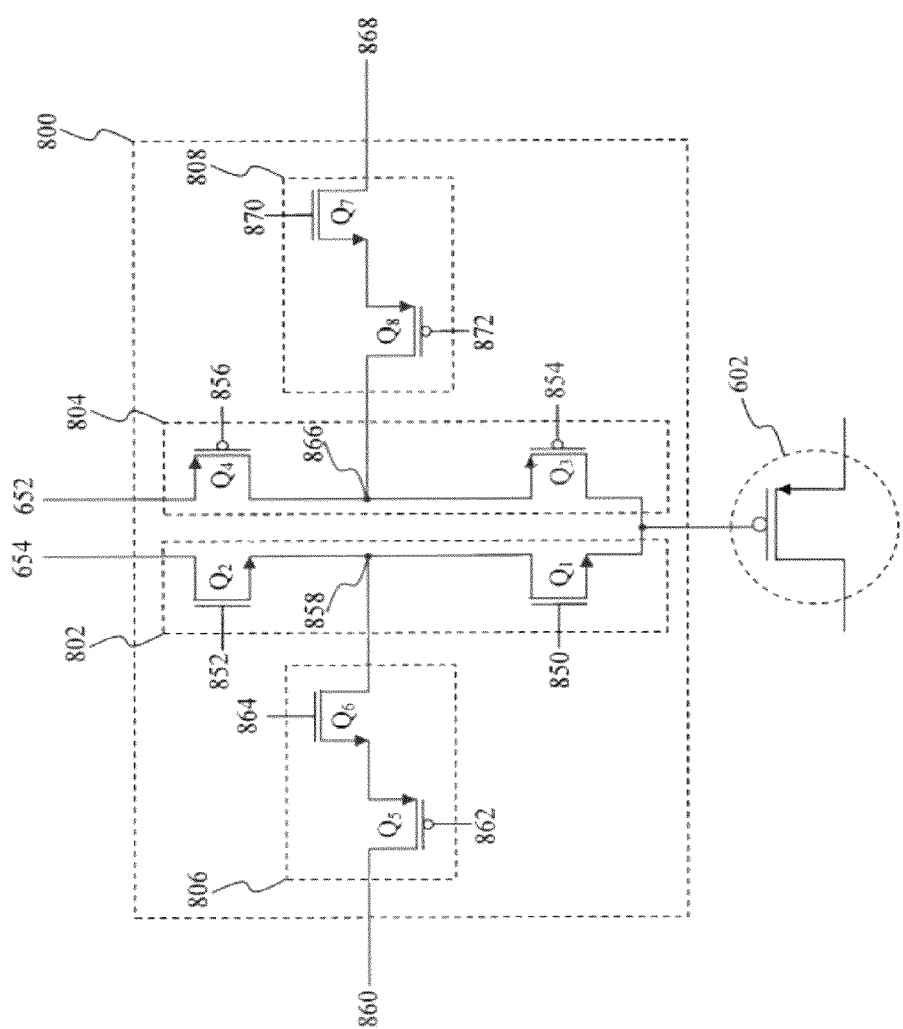
FIG. 8A illustrates a block diagram of a first switch bank that is implemented as part of the transmit switch according to an exemplary embodiment of the present invention.

FIG. 8A illustrates a block diagram of a first switch bank that is implemented as part of the transmit switch according to an exemplary embodiment of the present invention. A first switch bank 800 includes an activation switch 802 coupled to the p-type turn-on gate voltage 654 and a deactivation switch 804 coupled to the n-type turn-on gate voltage 652. The n-type turn-on gate voltage 652 and the p-type turn-on gate voltage 654 may be selectively applied to the gate of the p-type switching transistor 602 by activating and/or deactivating the activation switch 802 and/or the deactivation switch 804. Typically, the activation switch 802 and the deactivation switch 804 are complementary switches, namely only one of the activation switch 802 and the deactivation switch 804 is conducting at any given instance in time. When the activation switch 802 is conducting, the deactivation switch 804 is non-conducting. Likewise, when the deactivation switch 804 is conducting, the activation switch 802 is non-conducting. The first switch bank 800 may represent an exemplary embodiment of the first switch bank 610. In this exemplary embodiment, the activation switch 802 and the deactivation switch 804 represent exemplary embodiments of the first activation switch 618 and the first deactivation switch 620, respectively.

The first switch bank 800 includes the activation switch 802, the deactivation switch 804, an optional activation switch protection circuit 806, and an optional deactivation switch protection circuit 808. The activation switch 802 includes an n-type transistor $Q_1$ cascoded with an n-type transistor $Q_2$ to increase its reliability. A first reference 850, such as approximately 3.3V to provide an example, activates the n-type transistor $Q_1$. A second reference 852 is coupled to the n-type transistor $Q_2$. The second reference 852 may be a first voltage, such as approximately 3.3V to provide an example, to activate the n-type transistor $Q_2$ to apply the p-type turn-on gate voltage 654 to the p-type switching transistor 602. Alternatively, the second reference 852 may be a second voltage, such as approximately 0V to provide an example, to deactivate the n-type transistor $Q_2$ to prevent the p-type turn-on gate voltage 654 from being applied to the p-type switching transistor 602.

The deactivation switch 804 includes a p-type transistor $Q_3$ cascoded with a p-type transistor $Q_4$ to increase its reliability. A third reference 854, such as approximately 1.8V to provide an example, activates the p-type transistor $Q_3$. A fourth reference 856 is coupled to the p-type transistor $Q_4$. The fourth reference 856 may be a first voltage, such as approximately 1.8V to provide an example, to activate the p-type transistor $Q_4$ to apply the n-type tarn-on gate voltage 652 to the p-type switching transistor 602. Alternatively, the fourth reference 856 may be a second voltage, such as approximately 5V to provide an example, to deactivate the p-type transistor $Q_4$ to prevent the n-type turn-on gate voltage 652 from being applied to the p-type switching transistor 602.

The optional activation switch protection circuit 806 passes a switch protection reference 860 to become a protection voltage 858 between a drain of the n-type transistor $Q_1$ and a source of the n-type transistor $Q_2$ to protect the activation switch 802. The optional activation switch protection circuit 806 includes a p-type transistor $Q_5$ coupled to an n-type transistor $Q_6$. The switch protection reference 860, such as approximately 3.3V to provide an example, is coupled to a source of the p-type transistor $Q_5$. A first switch protection reference 862 is coupled to a gate of the p-type transistor $Q_5$. The first switch protection reference 862 activates the optional activation switch protection circuit 806 when it is at a first voltage, such as approximately 0V to provide an example. The first switch protection reference 862 deactivates the optional activation switch protection circuit 806 when it is at a second voltage, such as approximately 3.3V to provide an example. A second switch protection reference 864 is coupled to a gate of the n-type transistor $Q_6$. Typically, the second switch protection reference 864 is greater than approximately:

$$V_{860}+V_{TH,Q6}, \quad (5)$$

where $V_{860}$ represents a voltage level of the switch protection reference 860 and $V_{TH,Q6}$ represents a threshold voltage of the n-type transistor $Q_6$. Typically, the optional activation switch protection circuit 806 is activated to pass the switch protection reference 860 to become the protection voltage 858 when the activation switch 802 is deactivated.

The optional deactivation switch protection circuit 808 passes a switch protection reference 868 to become a protection voltage 866 between a drain of the p-type transistor $Q_3$ and a source of the p-type transistor $Q_4$ to protect the activation switch 802. The optional deactivation switch protection circuit 808 includes an n-type transistor $Q_7$ coupled to a p-type transistor $Q_8$. The switch protection reference 868, such as approximately 1.8V to provide an example, is coupled to a source of the n-type transistor $Q_7$. A first switch protection reference 870 is coupled to a gate of the n-type transistor $Q_7$. The first switch protection reference 870 activates the optional deactivation switch protection circuit 808 when it is at a first voltage, such as approximately 5V to provide an example. The first switch protection reference 870 deactivates the optional deactivation switch protection circuit 808 when it is at a second voltage, such as approximately 1.8V to provide an example. A second switch protection reference 872 is coupled to a gate of the p-type transistor $Q_8$. Typically, the second switch protection reference 872 is less than approximately:

$$V_{868}+V_{TH,Q8}, \quad (6)$$

where $V_{868}$ represents a voltage level of the switch protection reference 868 and $V_{TH,Q8}$ represents a threshold voltage of the p-type transistor $Q_8$. Typically, the optional deactivation switch protection circuit 808 is activated to pass the switch protection reference 868 to become the protection voltage 866 when the deactivation switch 804 is deactivated.

Figure 8B:
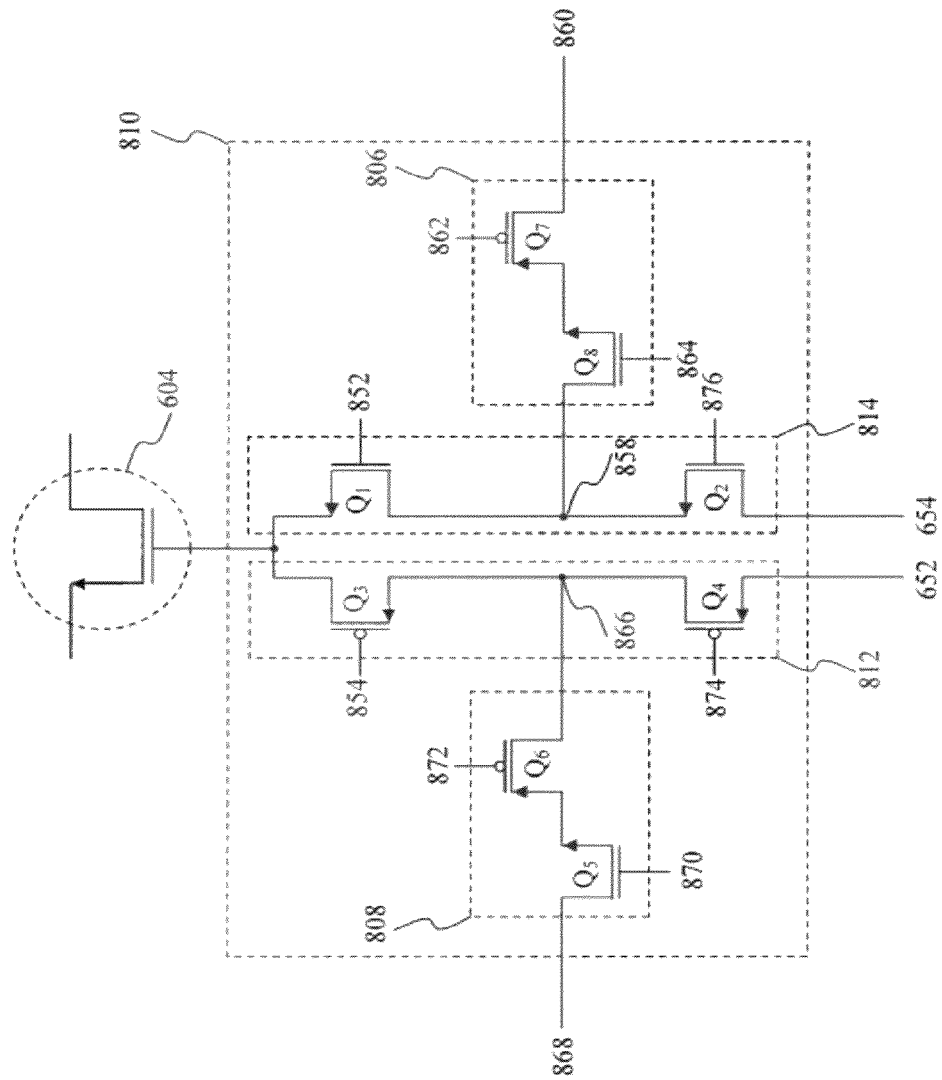
FIG. 8B illustrates a block diagram of a second switch bank that is implemented as part of the transmit switch according to an exemplary embodiment of the present invention.

FIG. 8B illustrates a block diagram of a second switch bank that is implemented as part of the transmit switch according to an exemplary embodiment of the present invention. A second switch bank 810 includes an activation switch 812 coupled to the n-type turn-on gate voltage 652 and a deactivation switch 814 coupled to the p-type turn-on gate voltage 654. The n-type turn-on gate voltage 652 and the p-type turn-on gate voltage 654 may be selectively applied to the n-type switching transistor 604 by activating and/or deactivating the activation switch 812 and/or the deactivation switch 814. The second switch bank 810 may represent an exemplary embodiment of the second switch bank 612. In this exemplary embodiment, the activation switch 802 and the deactivation switch 804 represent exemplary embodiments of the second activation switch 622 and the second deactivation switch 624, respectively. The second switch bank 810 shares many features in common with the first switch bank 800; therefore, only differences between the first switch bank 800 and the second switch bank 810 will be described in further detail.

The second switch bank 810 includes the optional activation switch protection circuit 806, the optional deactivation switch protection circuit 808, the activation switch 812, and the deactivation switch 814. The activation switch 812 operates in a substantially similar manner as the deactivation switch 804; however, a deactivation reference 874 is coupled to the p-type transistor $Q_4$. The deactivation reference 874 may be a first voltage, such as approximately 1.8V to provide an example, to activate the p-type transistor $Q_4$ to apply the n-type turn-on gate voltage 652 to the n-type switching transistor 604. Alternatively, the deactivation reference 874 may be a second voltage, such as approximately 5V to provide an example, to deactivate the p-type transistor $Q_4$ to prevent the n-type turn-on gate voltage 652 from being applied to the n-type switching transistor 604.

The deactivation switch 814 operates in a substantially similar manner as the activation switch 802; however, an activation reference 876 is coupled to the n-type transistor $Q_2$. The activation reference 876 may be a first voltage, such as approximately 3.3V to provide an example, to activate the n-type transistor $Q_2$ to apply the p-type turn-on gate voltage 654 to the n-type switching transistor 604. Alternatively, the activation reference 876 may be a second voltage, such as approximately 0V to provide an example, to deactivate the n-type transistor $Q_2$ to prevent the p-type turn-on gate voltage 654 from being applied to the n-type switching transistor 604.

Figure 8C:
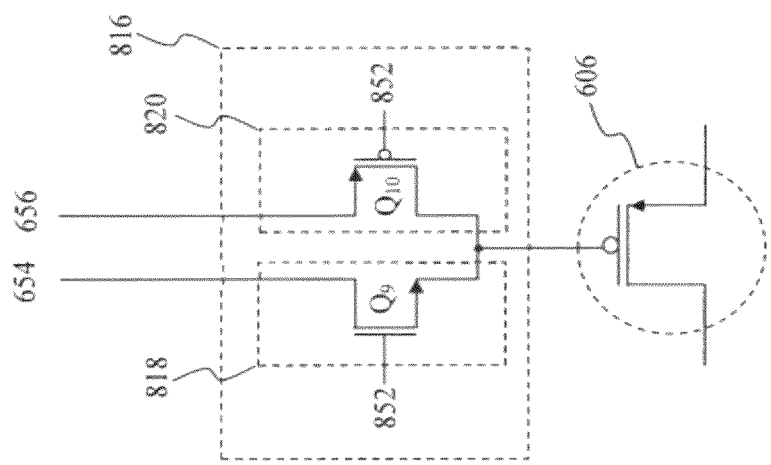
FIG. 8C illustrates a block diagram of a third switch bank that is implemented as part of the transmit switch according to an exemplary embodiment of the present invention.

FIG. 8C illustrates a block diagram of a third switch bank that is implemented as part of the transmit switch according to an exemplary embodiment of the present invention. A third switch bank 816 includes an activation switch 818 coupled to the p-type turn-on gate voltage 654 and a deactivation switch 820 coupled to the first potential 656. The p-type turn-on gate voltage 654 and the first potential 656 may be selectively applied to the p-type switching transistor 606 by activating and/or deactivating the activation switch 818 and/or the deactivation switch 820. Typically, the activation switch 818 and the deactivation switch 820 are complementary switches, namely only one of the activation switch 818 and the deactivation switch 820 is conducting at any given instance in time. When the activation switch 818 is conducting, the deactivation switch 820 is non-conducting. Likewise, when the deactivation switch 820 is conducting, the activation switch 818 is non-conducting. The third switch bank 816 may represent an exemplary embodiment of the second switch bank 612. In this exemplary embodiment, the activation switch 818 and the deactivation switch 820 represent exemplary embodiments of the third activation switch 626 and the third deactivation switch 628, respectively.

The third switch bank 816 includes the activation switch 818 and the deactivation switch 820. The activation switch 818 includes an n-type transistor $Q_9$ having the second reference 852 coupled to its respective gate. The second reference 852 may activate and/or deactivate the n-type transistor $Q_9$ to apply the p-type turn-on gate voltage 654 to the p-type switching transistor 606.

The deactivation switch 820 includes a p-type transistor $Q_{10}$ having the second reference 852 is coupled to its respective gate. The second reference 852 may activate and/or deactivate the p-type n-type transistor $Q_{10}$ to apply the first potential 656 to the p-type switching transistor 606.

Figure 8D:
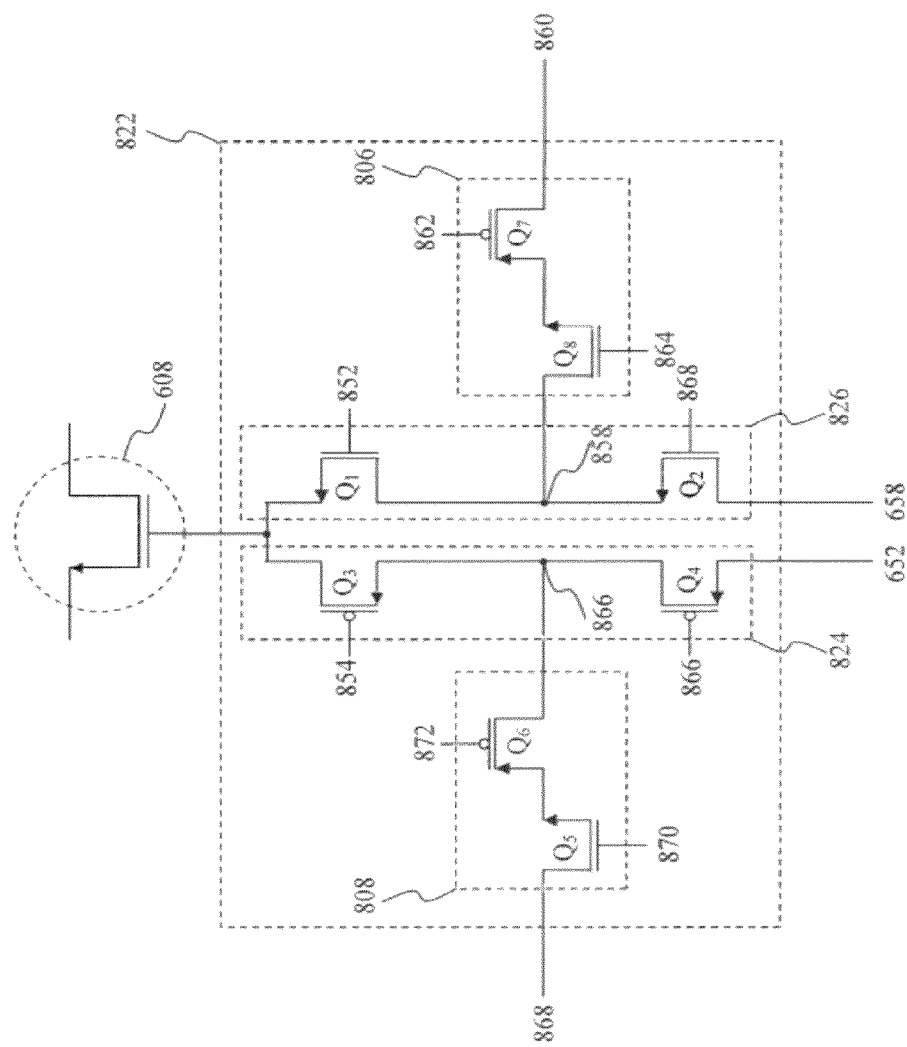
FIG. 8D illustrates a block diagram of a fourth switch bank that is implemented as part of the transmit switch according to an exemplary embodiment of the present invention.

FIG. 8D illustrates a block diagram of a fourth switch bank that is implemented as part of the transmit switch according to an exemplary embodiment of the present invention. A fourth switch bank 822 includes an activation switch 824 coupled the n-type turn-on gate voltage 652 and a deactivation switch 826 coupled to the second potential 658. The n-type turn-on gate voltage 652 and the second potential 658 may be selectively applied to the n-type switching transistor 608 by activating and/or deactivating the activation switch 824 and/or the deactivation switch 826. Typically, the activation switch 824 and the deactivation switch 826 are complementary switches, namely only one of the activation switch 824 and the deactivation switch 826 is conducting at any given instance in time. When the activation switch 824 is conducting, the deactivation switch 826 is non-conducting. Likewise, when the deactivation switch 826 is conducting, the activation switch 824 is non-conducting. The fourth switch bank 822 may represent an exemplary embodiment of the fourth switch bank 616. In this exemplary embodiment, the activation switch 824 and the deactivation switch 826 represent exemplary embodiments of the fourth activation switch 630 and the fourth deactivation switch 632, respectively.

The fourth switch bank 822 includes the optional activation switch protection circuit 806, the optional deactivation switch protection circuit 808, the activation switch 824, and the deactivation switch 826. The activation switch 824 and the deactivation switch 826 operate in a substantially similar manner as the activation switch 812 and the deactivation switch 814, respectively; however, the activation switch 824 provides the n-type turn-on gate voltage 652 to the n-type switching transistor 608 and the deactivation switch 814 provides the second potential 658 to the n-type switching transistor 608.

Figure 9:
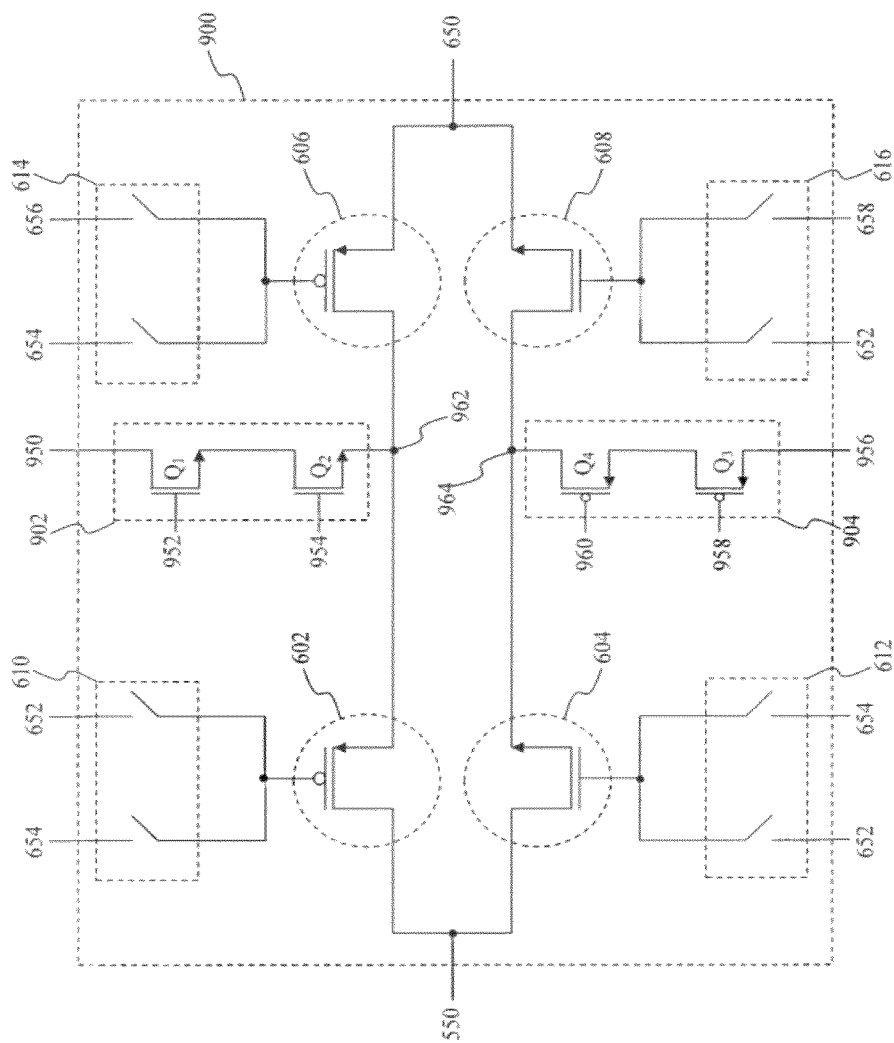
FIG. 9 illustrates a block diagram of a protection circuit that is implemented as part of the transmit switch according to an exemplary embodiment of the present invention.

FIG. 9 illustrates a block diagram of a protection circuit that is implemented as part of the transmit switch according to an exemplary embodiment of the present invention. A transmit switch 900 is characterized as passing the transmitted signal 550 to become the measurement signal 650 in a conducting mode of operation and preventing the transmitted signal 550 from being passed to become the measurement signal 650 in a non-conducting mode of operation. The transmit switch 900 includes one or more optional protection circuits to protect the transmit switch 900 when operating in the non-conducting mode of operation. The transmit switch 900 includes the p-type switching transistor 602, the n-type switching transistor 604, the p-type switching transistor 606, the n-type switching transistor 608, the first switch bank 610, the second switch bank 612, the third switch bank 614, the fourth switch bank 616, an optional switch protection circuit 902, and an optional switch protection circuit 904. The transmit switch 900 may represent an exemplary embodiment of the row-transmit switch 508 and/or the column-transmit switch 514.

The optional switch protection circuit 902 passes a first switch protection reference 950 to a protection voltage 962 between a drain of the p-type switching transistor 602 and a source of the p-type switching transistor 606 to increase the reliability of the transmit switch 900. The first switch protection reference 950 reduces the voltage drop that the p-type switching transistor 602 and/or the p-type switching transistor 606 must incur across their respective sources and drains to increase the reliability of the transmit switch 900. The optional switch protection circuit 902 includes an n-type transistor $Q_1$ and an n-type transistor $Q_2$. The n-type transistor $Q_1$ passes the first switch protection reference 950, such as approximately 1.8V to provide an example, from its respective source to drain in response to a first protection reference 952. The first protection reference 952 may be a first voltage, such as approximately 3.3V to provide an example, to activate the n-type transistor $Q_1$ or a second voltage, such as approximately 0V to provide an example, to deactivate the n-type transistor $Q_1$. The n-type transistor $Q_1$ is typically activated by the first protection reference 952 when the transmit switch 900 is operating in the non-conducting mode of operation to protect the p-type switching transistor 602 and the p-type switching transistor 606. The n-type transistor $Q_2$ passes the first switch protection reference 950 from its respective source to drain in response to a second protection reference 954, such as approximately 3.3V being applied to its respective gate.

The optional deactivation switch protection circuit 904 passes a second switch protection reference 956 to a protection voltage 964 between a drain of the n-type switching transistor 604 and a source of the n-type switching transistor 608 to increase the reliability of the transmit switch 900. The fixed switch protection reference 964 reduces the voltage drop that the n-type switching transistor 604 and/or the n-type switching transistor 608 must incur across their respective sources and drains to increase the reliability of the transmit switch 900. The optional switch protection circuit 904 includes a p-type transistor $Q_3$ and a p-type transistor $Q_4$. The p-type transistor $Q_3$ passes the second switch protection reference 956, such as approximately 3.3V to provide an example, from its respective source to drain in response to a first protection reference 958. The first protection reference 958 may be a first voltage, such as approximately 1.8V to provide an example, to activate the p-type transistor $Q_3$ or a second voltage, such as approximately 5V to provide an example, to deactivate the p-type transistor $Q_3$. The p-type transistor $Q_3$ is typically activated by the first protection reference 958 when the transmit switch 900 is operating in the non-conducting mode of operation to protect the n-type switching transistor 604 and the n-type switching transistor 608. The p-type transistor $Q_4$ passes the second switch protection reference 956 from its respective source to drain in response to a second protection reference 960, such as approximately 1.8V being applied to its respective gate.

Figure 10:
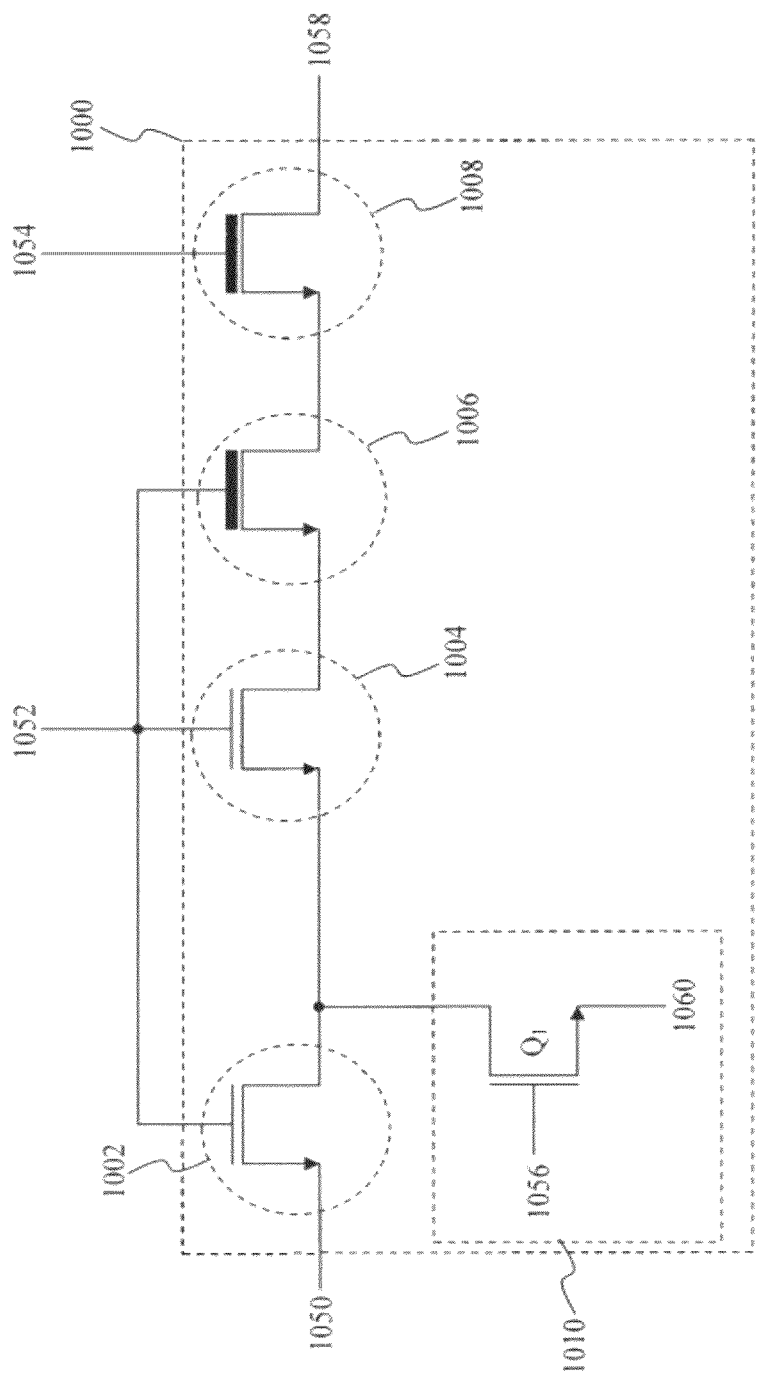
FIG. 10 illustrates a block diagram of a receive switch that is implemented as part of the transceiver according to an exemplary embodiment of the present invention.

A Receive Switch that is Implemented as Part of the Transceiver According to an Exemplary Embodiment of the Present Invention Thick Oxide Transistors to Protect Thin Oxide Transistors Against Large Voltage Swings FIG. 10 illustrates a block diagram of a receive switch that is implemented as part of the transceiver according to an exemplary embodiment of the present invention. A receive switch 1000 is characterized as passing a measurement signal 1050 to become a measurement signal 1058 in a conducting mode of operation and preventing the measurement signal 1050 from becoming the measurement signal 1058 in a non-conducting mode of operation. The receive switch 1000 may represent an exemplary embodiment of the column-receive switch 510. In this exemplary embodiment, the receive switch 1000 is characterized as passing the row measurement signal 552 to become the received signal 554 in the conducting mode of operation and preventing the row measurement signal 552 from becoming the received signal 554 in the non-conducting mode of operation. The receive switch 1000 may also represent an exemplary embodiment of the row-receive switch 512. In this exemplary embodiment, the receive switch 1000 is characterized as passing the column measurement signal 556 to become the received signal 554 in the conducting mode of operation and preventing the column measurement signal 556 from becoming the received signal 554 in the non-conducting mode of operation.

The receive switch 1000 includes an n-type thin-oxide switching transistor 1002, an n-type thin-oxide switching transistor 1004, an n-type native thick-oxide switching transistor 1006, an n-type native thick-oxide switching transistor 1008, and an optional switch protection circuit 1010. The measurement signal 1050 passes through respective drains and sources of the n-type thin-oxide switching transistor 1002, the n-type thin-oxide switching transistor 1004, and the n-type native thick-oxide switching transistor 1006 when these transistors are conducting. A first reference voltage 1052, such as approximately 1.5V to provide an example, activates the n-type thin-oxide switching transistor 1002, the n-type thin-oxide switching transistor 1004, and the n-type native thick-oxide switching transistor 1006. Typically, the n-type thin-oxide switching transistor 1002 and the n-type thin-oxide switching transistor 1004 have their respective sources and bulks connected together to reduce their on-resistance. The first reference voltage 1052 may be a first voltage, such as approximately 1.5V to provide an example, to activate the n-type thin-oxide switching transistor 1002, the n-type thin-oxide switching transistor 1004, and the n-type native thick-oxide switching transistor 1006 to pass the measurement signal 1050. Alternatively, the first reference voltage 1052 may be a second voltage, such as approximately 0V to provide an example, to deactivate the n-type thin-oxide switching transistor 1002, the n-type thin-oxide switching transistor 1004, the n-type native thick-oxide switching transistor 1006 to prevent passing of the measurement signal 1050.

The measurement signal 1050 passes from the respective drain and source of the n-type native thick-oxide switching transistor 1006 when the n-type native thick-oxide switching transistor 1008 to become the measurement signal 1058 when these transistors are conducting. A second reference voltage 1054, such as approximately 1.5V to provide an example, activates the n-type native thick-oxide switching transistor 1008. The n-type native thick-oxide switching transistor 1006 and/or the n-type native thick-oxide switching transistor 1008 reduces the voltage drop that n-type thin-oxide switching transistor 1002 and/or the n-type thin-oxide switching transistor 1004 must incur across their respective sources and drains to increase the reliability of the receive switch 1000.

The optional switch protection circuit 1010 protects the n-type thin-oxide switching transistor 1002 and/or the n-type thin-oxide switching transistor 1004 from unwanted signals that may pass through the n-type native thick-oxide switching transistor 1006 and/or n-type native thick-oxide switching transistor 1008 when the receive switch 1000 is operating in the non-conducting mode of operation. The optional switch protection circuit 1010 includes an n-type transistor $Q_1$. A third reference voltage 1056 may be a first voltage, such as approximately 1.5V to provide an example, to activate the n-type transistor $Q_1$. Alternatively, the third reference voltage 1056 may be a second voltage, such as approximately 0V to provide an example, to deactivate the n-type transistor $Q_1$. Typically, when the n-type thin-oxide switching transistor 1002, the n-type thin-oxide switching transistor 1004, the n-type native thick-oxide switching transistor 1006 are deactivated as discussed above, the n-type transistor $Q_1$ is activated to cause the voltage at the junction between the drain of the n-type thin-oxide switching transistor 1002 and/or the source of the n-type thin-oxide switching transistor 1004 to be approximately equal to a second potential 1060, such as approximately 0V to provide an example.

CONCLUSION

While various embodiments of the present invention have been described above, it should be understood that they have been presented by way of example, and not limitation. It will be apparent to persons skilled in the relevant art(s) that various changes in form and detail may be made therein without departing from the spirit and scope of the invention. Thus the present invention should not be limited by any of the above-described exemplary embodiments, but should be defined only in accordance with the following claims and their equivalents.

What is claimed is:

1. A touch-screen system, comprising:
   a touch-screen including a plurality of rows and a plurality of columns that are arranged to form a touch sensitive area; and
   a transceiver coupled to the touch-screen, the transceiver including:
      a transmitter,
      a receiver, and
      a switching module configured to:
         couple the transmitter to a corresponding row from among the plurality of rows and to couple a corresponding column from among the plurality of columns to the receiver in a pass-through mode of operation, and
         couple the transmitter to the corresponding column and to couple the corresponding row to the receiver in a crossover mode of operation.

2. The touch-screen system of claim 1, wherein the switching module comprises:
   a butterfly switching circuit including a plurality of switches that are configurable to form:
      a row-transmit path configured to couple the transmitter to the corresponding row in the pass-through mode of operation,
      a column-receive path configured to couple the corresponding column to the receiver in the pass-through mode of operation,
      a column-transmit path configured to couple the transmitter to the corresponding column in the crossover mode of operation, and
      a column-receive path configured to couple the corresponding row to the receiver in the crossover mode of operation.

3. The touch-screen system of claim 2, wherein the plurality of switches comprises:
   a row-transmit switch;
   a column-receive switch;
   a row-receive switch; and
   a column-transmit switch,
   wherein the row-transmit switch is closed and the column-transmit switch is open to form the row-transmit path,
   wherein the column-receive switch is closed and the row-receive switch is open to form the column-receive path,
   wherein the row-transmit switch is open and the column-transmit switch is closed to form the column-transmit path, and
   wherein the column-receive switch is open and the row-receive switch is closed to form the column-receive path.

4. The touch-screen system of claim 3, wherein the row-transmit switch or the column-transmit switch comprise:
   a first p-type transistor;
   a second p-type transistor coupled to the first p-type transistor;
   a first n-type transistor; and
   a second n-type transistor coupled to the first n-type transistor.

5. The touch-screen system of claim 4, further comprising:
   a switch protection circuit configured to pass a fixed switch protection reference between a drain of the first p-type transistor and a source of the second p-type transistor when the first and the second p-type transistors are non-conducting.

6. The touch-screen system of claim 4, wherein the first and the second p-type transistors are configured to be activated by applying a p-type turn-on gate voltage to their respective gates, and wherein the first and the second n-type transistors are configured to be activated by applying an n-type turn-on gate voltage to their respective gates.

7. The touch-screen system of claim 6, further comprising:
a gate control module configured to provide the p-type turn-on gate voltage and the n-type turn-on gate voltage based upon an output of the transmitter.

8. The touch-screen system of claim 7, wherein the p-type turn-on gate voltage or the n-type turn-on gate voltage is characterized as having a substantially similar frequency and phase as the output of the transmitter.

9. The touch-screen system of claim 7, wherein the gate control module comprises:
a bias control module configured to provide a first bias current and a second bias current;
a p-type turn-on voltage control module configured to operate upon the output of the transmitter to reduce a voltage swing of the output of the transmitter and to translate a mean of the output of the transmitter to provide the p-type turn-on gate voltage in response to the first bias current; and
an n-type turn-on voltage control module configured to operate upon the output of the transmitter to reduce a voltage swing of the output of the transmitter and to translate a mean of the output of the transmitter to provide the n-type turn-on gate voltage in response to the second bias current.

10. The touch-screen system of claim 6, wherein the first p-type transistor is configured to be deactivated by applying the n-type turn-on gate voltage to its respective gate, and
wherein the first n-type transistor is configured to be deactivated by applying the p-type turn-on gate voltage to its respective gate.

11. The touch-screen system of claim 10, further comprising:
a switch bank including:
an activation switch configured to apply the p-type turn-on gate voltage to the first p-type transistor,
a deactivation switch configured to apply the n-type turn-on gate voltage to the first p-type transistor,
an activation switch protection circuit configured to apply a first fixed switch protection reference to the activation switch when the deactivation switch applies the n-type turn-on gate voltage to the first p-type transistor, and
a deactivation switch protection circuit configured to apply a second fixed switch protection reference to the deactivation switch when the activation switch applies the p-type turn-on gate voltage.

12. The touch-screen system of claim 1, wherein the touch-screen system is implemented as part of a mobile device.

13. A switching module, comprising:
a row-transmit switch configured to couple a transmitter to a first port of the switching module in a pass-through mode of operation;
a column-receive switch configured to couple a second port of the switching module to a receiver in the pass-through mode of operation;
a row-receive switch configured to couple the transmitter to the second port in a crossover mode of operation;
a column-transmit switch configured to couple the first port to the receiver in the crossover mode of operation;
a gate control module configured to provide a p-type turn-on gate voltage and an n-type turn-on gate voltage based upon an output of the transmitter, the p-type turn-on gate voltage and the n-type turn-on gate voltage being applied to activate the row-transmit switch in the pass-through mode of operation or the column-transmit switch in the crossover mode of operation.

14. The switching module of claim 13, wherein the p-type turn-on gate voltage or the n-type turn-on gate voltage is characterized as having a substantially similar frequency and phase as the output of the transmitter.

15. The switching module of claim 13, wherein the gate control module comprises:
a bias control module configured to provide a first bias current and a second bias current;
a p-type turn-on voltage control module configured to determine a voltage swing and a mean value of the p-type turn-on gate voltage in response to the first bias current; and
an n-type turn-on voltage control module configured to determine a voltage swing and a mean value of the n-type turn-on gate voltage in response to the second bias current.

16. The switching module of claim 13, wherein the row-transmit switch or the column-transmit switch comprise:
a first p-type transistor;
a second p-type transistor coupled to the first p-type transistor;
a first n-type transistor; and
a second n-type transistor coupled to the first n-type transistor.

17. The switching module of claim 16, wherein the first and the second p-type transistors are configured to be activated by applying the p-type turn-on gate voltage to their respective gates, and wherein the first and the second n-type transistors are configured to be activated by applying the n-type turn-on gate voltage to their respective gates.

18. The switching module of claim 17, wherein the first p-type transistor is configured to be deactivated by applying the n-type turn-on gate voltage to its respective gate, and wherein the first n-type transistor is configured to be deactivated by applying the p-type turn-on gate voltage to its respective gate.

19. The switching module of claim 13, wherein the column-receive switch or the row-receive switch comprise:
a first n-type thin-oxide switching transistor;
a second n-type thin-oxide switching transistor coupled to the first n-type thin-oxide switching transistor;
a first n-type native thick-oxide switching transistor coupled to the second n-type thin-oxide switching transistor; and
a second n-type native thick-oxide switching transistor coupled to the first n-type native thick-oxide switching transistor.

20. The switching module of claim 19, wherein the first n-type thin-oxide switching transistor, the second n-type thin-oxide switching transistor, and the first n-type native thick-oxide switching transistor are configured to be activated in response to a first reference voltage, and wherein the second n-type native thick-oxide switching transistor is configured to be activated in response to a second reference voltage.

* * * * *

UNITED STATES PATENT AND TRADEMARK OFFICE
CERTIFICATE OF CORRECTION

PATENT NO. : 8,884,891 B2  
APPLICATION NO. : 13/097942  
DATED : November 11, 2014  
INVENTOR(S) : Sobel et al.

Page 1 of 1

It is certified that error appears in the above-identified patent and that said Letters Patent is hereby corrected as shown below:

Title Page, Item (57), Abstract, line 9, please replace "cascades" with --cascodes--.

Signed and Sealed this  
Tenth Day of March, 2015

Michelle K. Lee  
*Deputy Director of the United States Patent and Trademark Office*